(12) United States Patent
Dimitrov et al.

(10) Patent No.: US 8,878,849 B2
(45) Date of Patent: Nov. 4, 2014

(54) HORIZON SPLIT AMBIENT OCCLUSION

(75) Inventors: Rouslan Dimitrov, Sofia (BG); Louis Bavoil, London (GB); Miguel Sainz, London (GB)

(73) Assignee: Nvidia Corporation, Santa Clara, CA (US)

( * ) Notice: Subject to any disclaimer, the term of this patent is extended or adjusted under 35 U.S.C. 154(b) by 1511 days.

(21) Appl. No.: 12/002,071

(22) Filed: Dec. 14, 2007

(65) Prior Publication Data

US 2009/0153557 A1    Jun. 18, 2009

(51) Int. Cl.
*G06T 15/50*    (2011.01)

(52) U.S. Cl.
CPC ................................ *G06T 15/506* (2013.01)
USPC .......................................... 345/426; 345/419

(58) Field of Classification Search
USPC .......................................... 345/426, 545, 644
See application file for complete search history.

(56) References Cited

U.S. PATENT DOCUMENTS

| | | | |
|---|---|---|---|
| 4,958,305 A | 9/1990 | Piazza | |
| 5,043,921 A | 8/1991 | Gonzalez-Lopez et al. | |
| 5,369,741 A | 11/1994 | Hartog et al. | |
| 5,583,974 A | 12/1996 | Winner et al. | |
| 5,596,686 A | 1/1997 | Duluk, Jr. | |
| 5,694,143 A | 12/1997 | Fielder et al. | |
| 5,751,291 A | 5/1998 | Olsen et al. | |
| 5,761,400 A | 6/1998 | Derby et al. | |
| 5,909,595 A | 6/1999 | Rosenthal et al. | |
| 5,914,721 A | 6/1999 | Lim | |
| 5,990,904 A | 11/1999 | Griffin | |
| 6,046,746 A | 4/2000 | Deering | |
| 6,052,128 A | 4/2000 | Narayanaswami et al. | |
| 6,052,129 A | 4/2000 | Fowler et al. | |
| 6,091,428 A | 7/2000 | Piazza et al. | |
| 6,094,200 A | 7/2000 | Olsen et al. | |
| 6,172,670 B1 | 1/2001 | Oka et al. | |
| 6,246,415 B1 | 6/2001 | Grossman et al. | |
| 6,323,860 B1 | 11/2001 | Zhu et al. | |
| 6,373,485 B2 | 4/2002 | Sowizral et al. | |
| 6,407,741 B1 | 6/2002 | Morein et al. | |
| 6,445,390 B1 | 9/2002 | Aftosmis et al. | |
| 6,476,807 B1 | 11/2002 | Duluk, Jr. et al. | |
| 6,480,205 B1 | 11/2002 | Greene et al. | |
| 6,525,726 B1 | 2/2003 | Xie et al. | |
| 6,630,933 B1 | 10/2003 | Van Hook | |

(Continued)

OTHER PUBLICATIONS

Shanmugam, Perumaal et al. "Hardware Accelerated Ambient Occlusion Techniques on GPUs" Apr. 2007 ACM pp. 73-79.*

(Continued)

*Primary Examiner* — Maurice L McDowell, Jr.

(57) ABSTRACT

The method includes receiving a plurality of graphics primitives for rendering at a GPU of a computer system and rendering graphics primitives into pixel parameters of the pixels of a display, wherein the parameters include pixel depth values and pixel normal values. For each pixel of the display, an ambient occlusion process is performed. The algorithm takes as input a ND-buffer containing pixel depth values and pixel normals. Based on the pixel 3-D position and the pixel normal vector, horizon heights are computed by sampling the ND-buffer and an occlusion term is computed for each pixel based on the horizon heights. Based on the pixel 3-D position, the pixel normal vector, a normal occlusion term is computed by sampling the ND-buffer above the horizon in multiple directions. An ambient occlusion illumination value is computed by combining the horizon occlusion term and the normal occlusion term.

12 Claims, 6 Drawing Sheets

(56) References Cited

U.S. PATENT DOCUMENTS

| | | |
|---|---|---|
| 6,636,212 B1 | 10/2003 | Zhu |
| 6,636,215 B1 | 10/2003 | Greene |
| 6,646,639 B1 | 11/2003 | Greene et al. |
| 6,677,945 B2 | 1/2004 | Lapidous et al. |
| 6,717,576 B1 | 4/2004 | Duluk, Jr. et al. |
| 6,720,964 B1 | 4/2004 | Fowler et al. |
| 6,862,025 B2 | 3/2005 | Buehler |
| 6,900,800 B2 | 5/2005 | Baldwin |
| 6,924,801 B1 | 8/2005 | Dorbie |
| 7,030,877 B1 | 4/2006 | Sell |
| 7,091,971 B2 | 8/2006 | Morein |
| 7,091,973 B1 * | 8/2006 | Cohen .......................... 345/426 |
| 7,218,317 B2 | 5/2007 | Liao et al. |
| 7,242,400 B2 | 7/2007 | Van Hook et al. |
| 8,269,769 B1 | 9/2012 | Voorhies et al. |
| 8,390,619 B1 | 3/2013 | Voorhies et al. |

OTHER PUBLICATIONS

Hegeman, Kyle et al. "Approximate Ambient Occlusion for Trees" Mar. 2006 ACM pp. 87-91.*

Kontkanen, Janne et al. "Ambient Occlusion Fields" Apr. 2005 ACM pp. 41-47.*

M Mei.beta.ner, D. Bartz, and R. Gunther and W. Stra.beta.er, "Visibility Driven Rasterization," 2001, Computer Graphics Forum, vol. 20 No. 4, p. 283-294.

M.J. Aftosmis, "Solution Adapive Cartesian Grid Methods for Aerodynamic Flows With Complex Geometrics", Mar. 3, 1997, Lecture noes for 28th Cmputational Fluid Dynamics Lecture Series, von Kaman Institute for Fluid Dynamics, pp. 88-96.

Michael D. McCool, Chris Wales, Kevin Moule, "Incremental and Hierarchical Hilbert Order Edge Equation Polygon Rasterization", Aug. 2001, Proceedings of the ACM SIGGRAPH/EUROGRAPHICS workshop on Graphics Hardware, pp. 65-72d.

* cited by examiner

HORIZON SPLIT AMBIENT OCCLUSION

FIELD OF THE INVENTION

The present invention is generally related to hardware accelerated graphics computer systems.

BACKGROUND OF THE INVENTION

Ambient occlusion is a technique that computes the amount of light reaching a point on a diffuse surface based on its directly visible occluders. It gives perceptual clues of depth, curvature, and spatial proximity and thus is important for realistic rendering. The concept of ambient occlusion was pioneered by accessibility maps and obscurances.

Ambient occlusion terms can be computed using image-based algorithms. For instance, one prior art implements ambient occlusion on graphics hardware by averaging hard shadows from light sources distributed around the scene, using shadow mapping. This approach typically requires hundreds of point light sources to converge to a smooth solution. In another prior art solution, obscurances with color bleeding are computed based on casting bundles of rays in random directions, which can be implemented on graphics hardware using depth peeling from multiple viewpoints. Hardware-accelerated occlusion queries can also be used to compute ambient occlusion per face or per vertex. Each of these solutions is typically implemented using an "off-line" renderer, where the computations are performed in a non-real-time basis.

In real-time graphics, for static scenes, ambient occlusion terms can be precomputed at the vertices or in light maps. For example, one prior art solution computes bent normals by averaging the direction of the unoccluded rays in the hemisphere. In another prior art solution, ambient occlusion fields render inter-object ambient occlusion, without self-occlusion. In yet another prior art solution, a volumetric approach is taken whereby ambient occlusion values are stored in a 3D grid and linear interpolation is used. All of these techniques mentioned above require scene-dependent precomputation, which is not compatible with maintaining reasonable frame rates for real-time graphics applications with complex scenes.

In a more recent prior art solution, a method for rendering ambient occlusion in screen space is implemented by using a postprocessing pass based on a depth buffer from the eye's point of view. The technique recovers eye-space positions from the depth values in the depth buffer and samples a sphere around the point. Then it compares the depth of the samples with the depth of the point and computes an approximate ambient occlusion term based on the result of these comparisons.

In another prior art solution, solid angles occluded by neighboring pixels in screen space are accumulated based on the pixel eye-space positions and normals stored in an ND-buffer (e.g., normal buffer and depth buffer). The efficiency of this image-space method relies on the fact that neighbor pixels in screen space are likely to come from objects that are close to each other in world space. To capture the occlusion from distant occluders, the occlusion from precomputed spheres is added to the image-space occlusion. To reduce under-occlusion artifacts, the solution requires two ND-buffers: one for the front faces and one for the back faces. This image-based method has over-occlusion issues because all the samples are assumed to be visible from the surface point. Additionally, the requirement for the two ND-buffers increases the cost of a computer system capable of rendering real-time ambient occlusion graphics applications.

Thus, what is required is a solution capable of implementing real-time ambient occlusion graphics rendering while minimizing the visual artifacts and avoiding precomputation of geometric elements. What is further required is a solution that can compute per pixel approximated ambient occlusion as a fixed cost postprocessing pass, which can be combined with an image with minimal intrusion.

SUMMARY OF THE INVENTION

Embodiments of the present invention provide a solution capable of implementing real-time ambient occlusion graphics rendering while minimizing the visual artifacts and avoiding precomputation of geometric elements. Embodiments of the present invention further provide a solution that can compute per pixel approximated ambient occlusion as a fixed cost postprocessing pass, which can be combined with an image with minimal intrusion.

In one embodiment, the present invention is implemented as a method for computing ambient occlusion illumination. The method includes receiving a plurality of graphics primitives for rendering at a GPU of a computer system and rendering graphics primitives into pixel parameters of the pixels of a display, wherein the parameters include pixel depth values and pixel normal values. For each pixel of the display, an ambient occlusion estimation process is performed. Based on the pixel depth values, the 3-D eye space position corresponding to the pixel is computed. Based on the eye space position and the pixel normal values, horizon heights around the pixel are computed. A horizon ambient contribution can then be computed in relation to these heights. Based on a 3-D position of the point on the surface and the horizon height, a normal occlusion term for the point is computed and a final ambient occlusion illumination value is computed by combining the horizon occlusion term and the normal occlusion term.

In this manner, the ambient occlusion algorithm can operate on the depth buffer of a scene being rendered and the associated per-pixel normal buffer. The ambient occlusion algorithm can be implemented on the GPU graphics hardware in a pixel shader, independently of the scene geometry, thereby intelligently taking advantage of the hardware acceleration provided by the resources of the GPU. This allows the ambient occlusion algorithm to render high-quality ambient occlusion at interactive frame rates on current GPUs.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
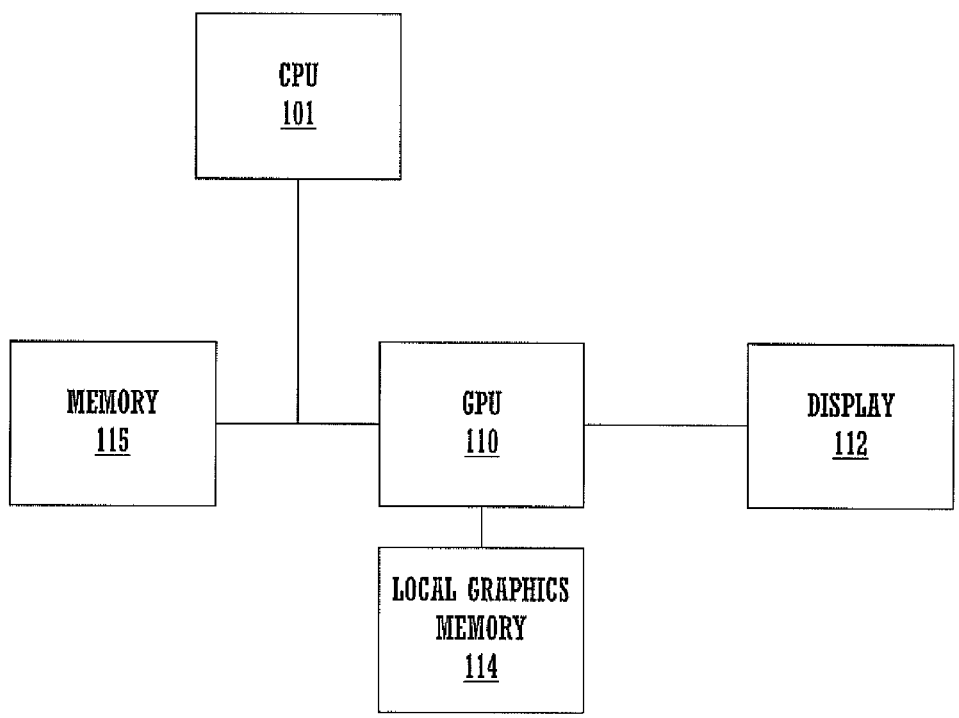
FIG. 1 shows a computer system in accordance with one embodiment of the present invention.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

EMBODIMENTS OF THE INVENTION

Figure 2:
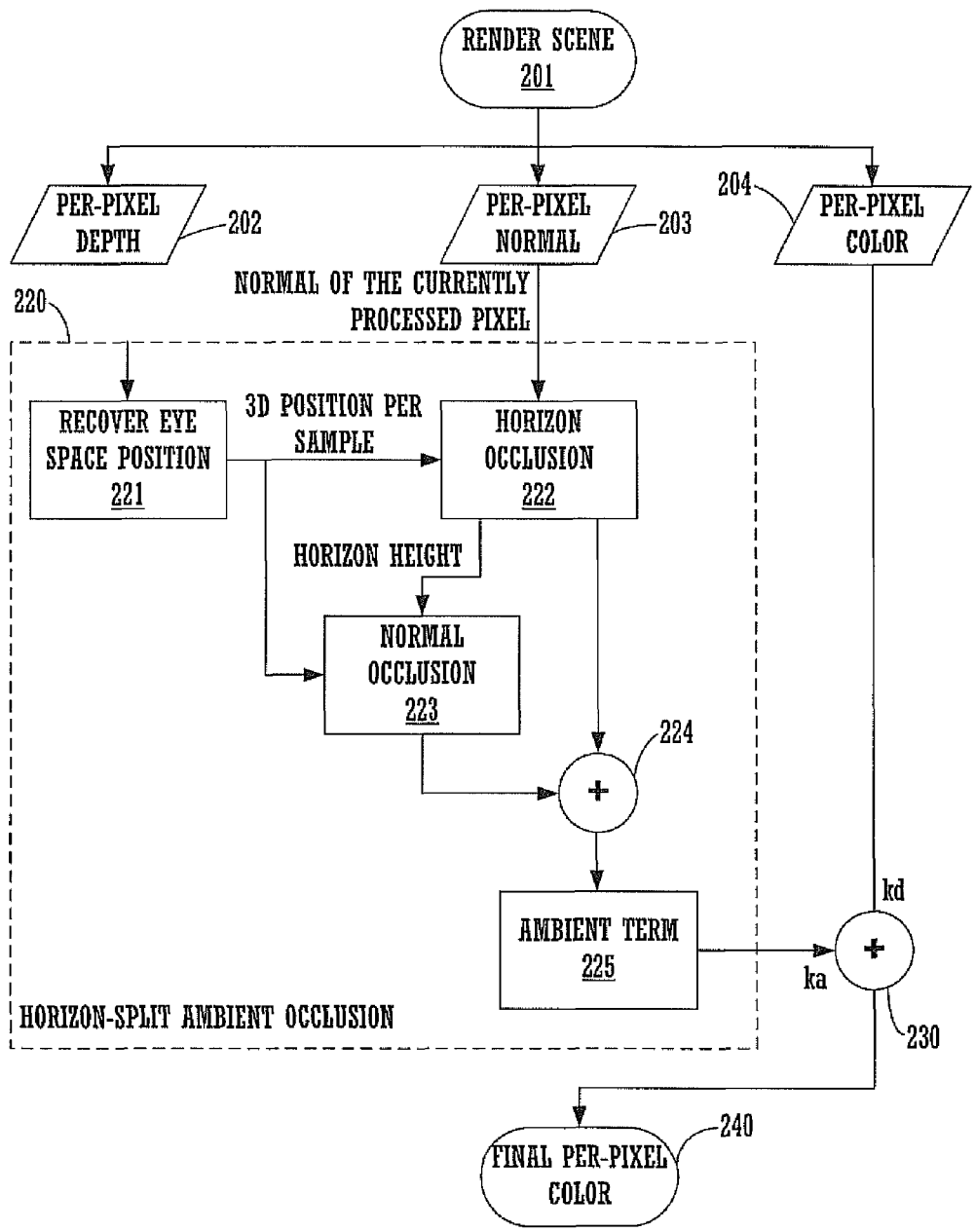
FIG. 2 shows a flow diagram of an exemplary ambient occlusion algorithm in accordance with one embodiment of the present invention.

FIG. 2 shows a flow diagram of an exemplary ambient occlusion algorithm 200 in accordance with one embodiment of the present invention. As illustrated in FIG. 2, the algorithm 200 begins with the rendering of a 3-D scene in step 201 and concludes with a final per pixel color being rendered into the frame buffer in step 240.

The ambient occlusion algorithm shown in FIG. 2 operates on the depth buffer (e.g., within local graphics memory 114) of a scene being rendered and the associated per-pixel normal buffer (e.g., within the local graphics memory 114). The ambient occlusion algorithm can be implemented on the GPU 110 graphics hardware in a pixel shader, independently of the scene geometry, thereby intelligently taking advantage of the hardware acceleration provided by the resources of the GPU 110. In one embodiment, the ambient occlusion algorithm 200 further includes heuristics to reduce artifacts due to the incompleteness of the input data and includes parameters to make the algorithm readily customizable for quality or performance purposes. In this manner, the ambient occlusion algorithm 200 can render high-quality ambient occlusion at interactive frame rates on current GPUs. This enables the GPU to support real-time interactive 3-D graphics applications that perform high fidelity ambient occlusion illumination at a reasonable frame rates.

The algorithm 200 begins in step 201 with the rendering of a 3-D scene by the GPU (e.g., a GPU 110). As described above, the ambient occlusion algorithm 200 operates on the depth buffer and the normal buffer of the scene as it is being rendered. The GPU 110 renders received graphics primitives into pixel parameters of the pixels of a display. These pixel parameters include pixel depth values, pixel normal values, and the like. As each primitive is rasterized and rendered by the GPU, each primitive's per pixel depth contribution is accumulated in the depth buffer, as shown by step 202. For each pixel of the display, a depth value (e.g., z value) is stored. Similarly, as shown by step 203, for each pixel of the display, as each primitive is rasterized in rendered by the GPU, the primitive's per pixel normal vector is accumulated and stored as a resulting per pixel normal vector, or simply "normal". The result of the rendering in step 201 also results in a per pixel color value as shown by step 204.

The horizon split ambient occlusion process 220 is a portion of the overall algorithm 200 that operates using the per pixel depth values from the depth buffer (e.g., step 202) and the per pixel normals from the normal buffer (e.g., step 203) as inputs. For example, in one embodiment, the horizon split ambient occlusion process 220 accesses an ND-buffer (e.g., normal buffer and depth buffer stored within the local graphics memory 114) storing linear depths and normals for the pixels on the screen.

At step 221, for each pixel, process 220 computes an eye-space position of its corresponding surface point "P". This results in a three-dimensional position per sample on the rendered surface. As shown in FIG. 2, the 3-D position is passed as an input to a horizon occlusion process at step 222. At step 222, the first integral from the following ambient occlusion illumination equation is evaluated:

$$A = 1 - \frac{1}{\pi}\left(\int_{\theta=0}^{2\pi} T(\theta)d\theta + \int_{\theta=0}^{2\pi}\int_{z=H(\theta)}^{1} V_{\vec{\omega}}(\vec{n}\cdot\vec{\omega})d\omega\right)$$

Where "A" is the ambient occlusion illumination, $\theta$ is the direction, $T(\theta)$ is the horizon occlusion in direction $\theta$, $H(\theta)$ is the horizon height in direction $\theta$, $\omega$ is the direction of rays in from the point P, n is the surface normal, and z is the depth. Accordingly, at step 222, the horizon height $H(\theta)$ and its occlusion $T(\theta)=H(\theta)^2$ are computed, and at step 223, the second integral from the ambient occlusion illumination equation is evaluated by means of tracing additional normal rays in the part of the hemisphere above $H(\theta)$ to complete the sampling of the hemisphere. And then, at step 224, normal occlusion and the horizon occlusion are summed to produce the ambient occlusion term "A". The ambient occlusion illumination is then transmitted to a combination process 230 with the per pixel color from step 204. This results in the final per pixel color at step 240 which is, for example, written back out into the frame buffer. The final per pixel color includes the effects from the ambient occlusion illumination, and is used to render a realistic 3-D scene that incorporates realistic high fidelity ambient illumination effects. It should be noted that the ambient occlusion illumination and the per-pixel color can be combined in a number of different ways.

As described above, the combination of the ambient occlusion illumination with the pixel colors in step 230 can be obtained by means of a weighted summation with the final color C=(A*Ambient+Color), where Ambient is the color of the ambient light, and Color is the pixel color of the image obtained with any shading model.

Alternatively, the final color C can also be obtained by modulating the pixel colors with the ambient occlusion illumination with the final color C=A*Color, where Color is the pixel color of the image obtained with any shading model.

Figure 3:
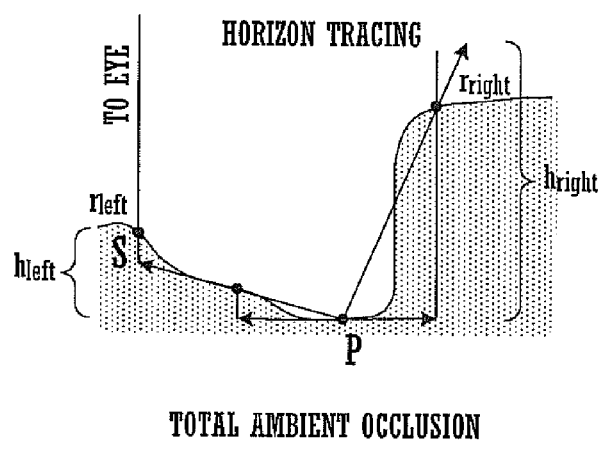
FIG. 3 shows a diagram illustrating the manner in which the horizon height term $H(\theta)$ is computed in accordance with one embodiment of the present invention.

As described above, the horizon split ambient occlusion process 220 uses a set of random directions $\theta$ distributed around the normal n at point P on the surface S. For each angle $\theta$, the height of the horizon $H(\theta)$ is computed by marching in the depth buffer along a line projected onto the tangent plane in direction $\theta$. A side view of the process is shown by FIG. 3.

Figure 4:
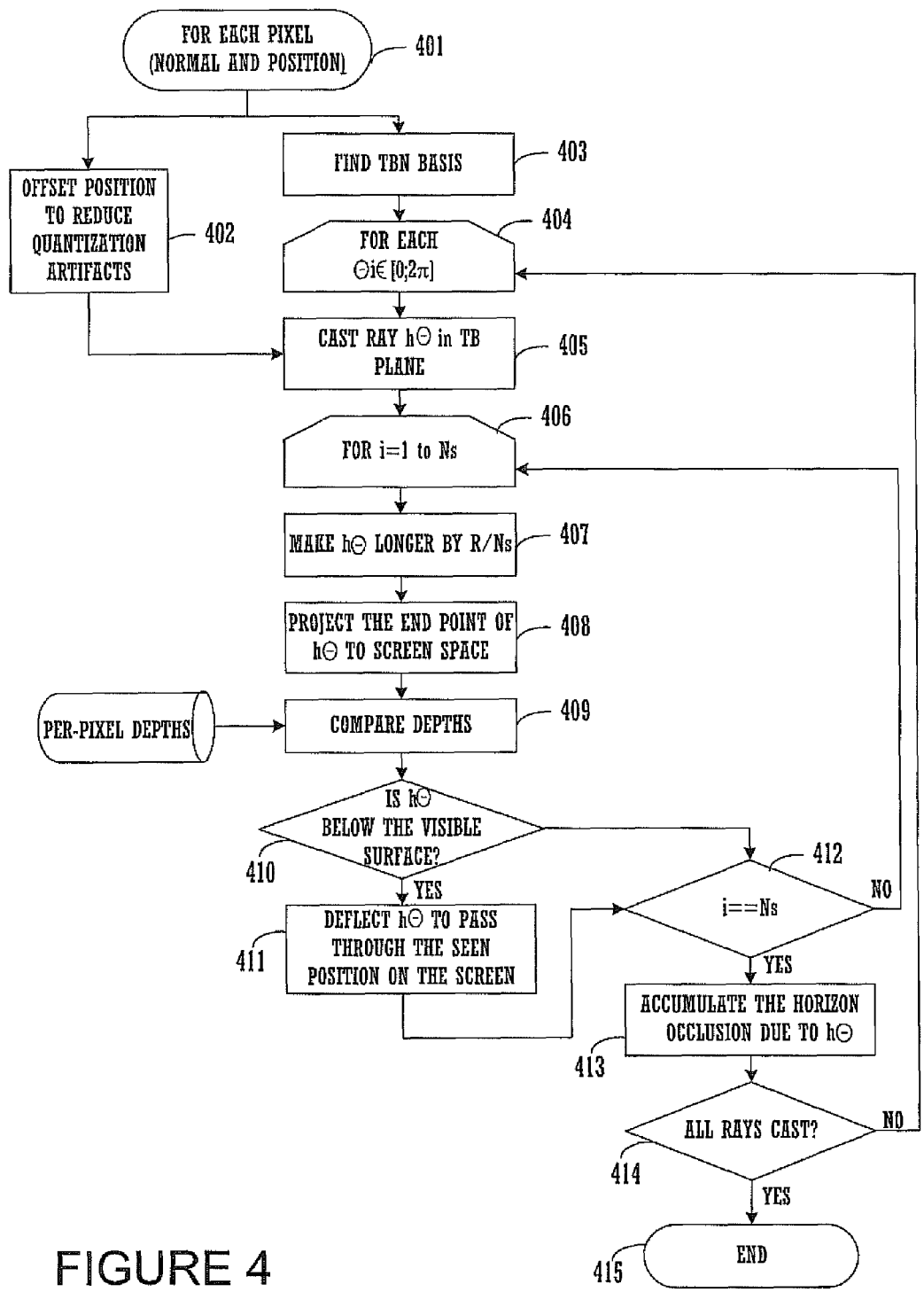
FIG. 4 shows a flow chart of an exemplary of height computation process in accordance with one embodiment of the present invention.

FIG. 4 shows a flow chart of an exemplary of height computation process 400 in accordance with one embodiment of the present invention. Process 400 shows a flowchart of exemplary pseudo code steps 401 through 415 for computing height of the horizon $H(\theta)$.

Thus, for a given angle $\theta$, the problem is to find the height of the horizon $H(\theta)$ seen from P within a certain radius of influence R around P. Starting with a ray $h\Theta=(P, t)$ where t is a surface tangent at P in the direction $\theta$, the process incrementally extends the length of this ray Ns times. At each step, the end point Q of the ray $h\Theta$ is projected in screen space and its depth is compared with the depth of the corresponding point in the depth buffer. This is shown by steps 401-409.

If the later is closer (Q is below the surface seen from the eye) as determined in step 410, and additional conditions are satisfied, then ray $h\Theta$ is deflected towards the intersection point I and its length is normalized and rescaled to R/Ns*i (where i is the iteration value in step 406). The horizon rays $h\Theta$ are deflected only if Q is within the distance R from P and if the candidate horizon ray has a proper direction (e.g., not inverted tangential component). This procedure is applied Nd times per pixel for randomly distributed angles $\theta$ distributed around the normal and the resulting heights define a piecewise constant approximation of the horizon line $H(\theta)$ on the hemisphere $\Omega$, until all rays have been cast, as shown by steps 412 and 414.

With respect to the horizon occlusion term $T(\theta)$, the horizon occlusion term from the ambient occlusion illumination equation above is:

$$O_T = \frac{1}{\pi}\int_{\theta=0}^{2\pi} T(\theta)d\theta$$
$$= \frac{1}{\pi}\int_{\theta=0}^{2\pi}\int_{z=0}^{H(\theta)} (\vec{n}\cdot\vec{\omega})d\omega$$

In one embodiment, to perform the integration, process 220 uses cylindrical coordinates (r, $\theta$, z), where $d\omega=dzd\theta$ with r=1. Process 222 partitions $\Omega$ below H with adjacent vertical hemispherical lunes of height $H(\theta_i)$ subtending an angle $\alpha=\theta_{i+1}-\theta_i=2\pi/Nd$ around the normal. Process 222 then approximates the occlusion OT by:

$$O_T = \frac{1}{\pi}\sum_{i=1}^{N_d}\int_0^{H(\theta_i)}\int_{\theta_i}^{\theta_{i+1}} (\vec{n}\cdot\vec{\omega})d\theta dz$$
$$= \frac{\alpha}{\pi}\sum_{i=1}^{N_d}\int_0^{H(\theta_i)} (\vec{n}\cdot\vec{\omega})dz$$
$$= \frac{2}{N_d}\sum_{i=1}^{N_d}\int_0^{H(\theta_i)} z\,dz$$
$$= \frac{1}{N_d}\sum_{i=1}^{N_d} H^2(\theta_i)dz$$

Horizon occlusion typically produces good results for continuous surfaces with a single layer of depth complexity. A complementary algorithm to account for more complex occlusions such as inter-object occlusion is described below.

Figure 5:
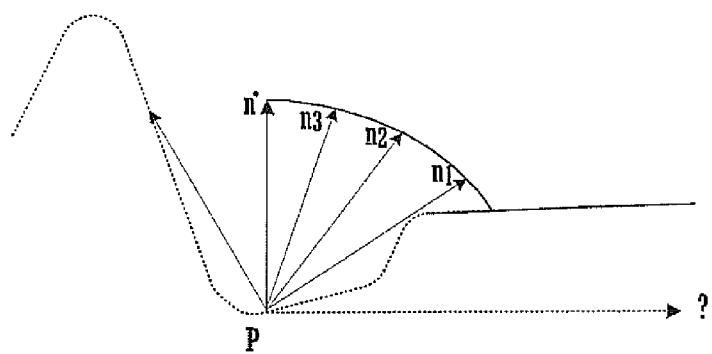
FIG. 5 shows the manner in which process partitions $\Omega$ above H with adjacent vertical stripes of quadrilateral patches delimited by the heights $z_k$ for a normal occlusion process in accordance with one embodiment of the present invention.

In respect to the normal occlusion, process 223 partitions $\Omega$ above H with adjacent vertical stripes of quadrilateral patches delimited by the heights $z_k$ as shown in FIG. 5. The normal occlusion for a given direction $t_i$ is:

$$O_{N,i}(z_k) = \frac{1}{\pi}\int_{\theta=\theta_i}^{\theta_{i+1}}\int_{z_k}^{z_{k+1}} V(\vec{\omega})(\vec{n}\cdot\vec{\omega})d\omega$$
$$= \frac{\alpha}{\pi}\int_{z_k}^{z_{k+1}} V(\vec{\omega})(\vec{n}\cdot\vec{\omega})d\omega$$

-continued $$= \frac{2}{N_d} \int_{z_k}^{z_{k+1}} V(\vec{\omega}) z \, d\omega$$

$$= \frac{1}{N_d}(z_{k+1}^2 - z_k^2) V(\vec{\omega})$$

The above equation is a valid approximation for any type of patch distribution. By picking a specific distribution, the above equation can be simplified so that each patch contributes the same amount of occlusion, which is more efficient. From a Monte-Carlo point of view, such a distribution is doing importance sampling using a cosine distribution in the upper part of the hemisphere.

The total normal occlusion is:

$$O_N = \sum_{i=1}^{N_d} \sum_{k=1}^{N_n} \frac{V(\vec{\omega})}{N_n N_d}$$

For each patch $P_k$, process 223 determines $V(\omega)$ in the direction $r_k$ by doing a linear search in the depth buffer in direction ~w with a fixed number of steps. After determining $V(\omega)$, process 223 accumulates its occlusion contribution to the total occlusion O. Thus, as described above, the final light intensity from ambient occlusion at P is:

$$A = 1 - (O_T + O_N)$$

With respect to linear attenuation, it should be noted that at a distance R around objects, sharp occlusion boundaries may be visible because these occluders may strongly influence the ambient occlusion once they begin to be sampled. To soften these sharp edges, the processes in 220 can weight the contribution of each ray by a linear attenuation function based on the normalized distance between P and the occluder.

Parameter analysis of the process 220 is now described. It should be appreciated that a number of different parameters control the performance and overall quality of the ambient occlusion estimation. Radius of influence R defines the maximum distance of influence of any given occluder. Increasing this radius has two side effects: occluder undersampling in the hemisphere (requiring more sampling rays to maintain image quality) and stronger ambient occlusion values due to the existence of more occluders (e.g. we can maximize the occlusion for the walls inside a closed room if the radius is large enough to include the opposing walls). The number of tangent directions Nd is the number of rays around the normal used to estimate the horizon split line H(q). The total number of traced rays is proportional to this parameter. The number of normal rays Nn is the number of rays that will be used during ray marching for each tangential direction. These rays are distributed on the subset of the hemisphere above the horizon line H(θ) determined during the horizon tracing pass for each direction Nd. The number of steps Ns is the number of steps that both the horizon tracing and the ray marching passes will evaluate on a per ray basis. This parameter affects performance directly and also the quality of the results for scenes with high geometric detail.

Figure 6:
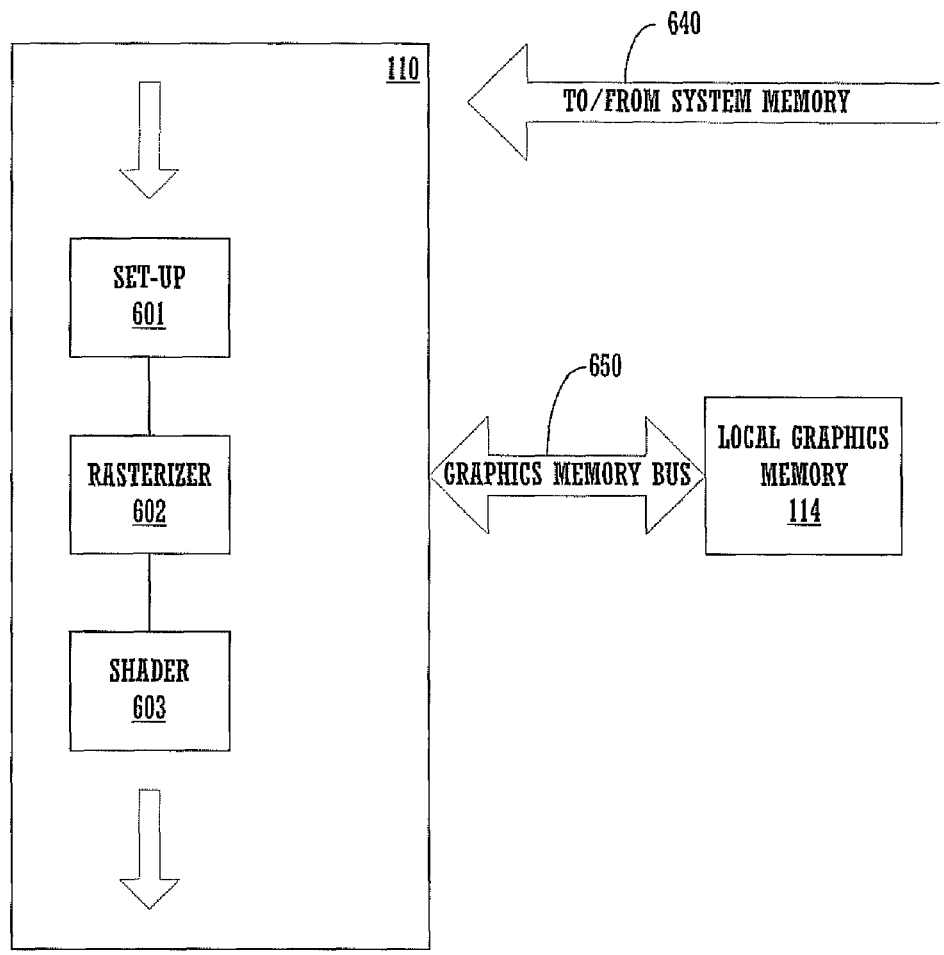
FIG. 6 shows exemplary components within a GPU that implements the functionality in accordance with one embodiment of the present invention.

The FIG. 6 embodiment shows exemplary components within the GPU 110 that implement the functionality of embodiments of the present invention. The setup unit 601 functions by receiving groups, streams, and the like, of primitives from a graphics application executing on the host CPU (e.g., CPU 101). The communications link 640 shows communications pathways to and from the system memory of the computer system (e.g., via the system memory bus). The communications link 650 shows the communication pathways to and from the frame buffer and local graphics memory 114. The setup unit 601 prepares this information for rasterization by the raster unit 602 and to these descriptions based upon vertices into edge descriptions.

The rasterizer unit 602 subsequently converts these edge descriptions into filled areas comprising actual pixel descriptions (e.g., pixel areas, pixel sub-samples, etc.). The descriptions include depth values and normal vectors for each pixel. The pixel descriptions are subsequently passed along to the shader unit 603 within the GPU 110 for further processing and rendering.

The shader unit 603 performs pixel shader processing for each of the pixels. The shader unit 603 typically operates on the pixels in accordance with the parameters iterated across each of the pixels.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A GPU for computing ambient occlusion illumination for a scene, comprising:
   the GPU for performing:
   a set-up unit for receiving a group of primitives from a graphics application and generating edge descriptions for the primitives;
   a rasterizer unit coupled to the setup unit for receiving the edge descriptions and rasterizing the primitives into pixel parameters of pixels of a display, wherein the parameters include pixel depth values and pixel normal vectors;
   a shader unit coupled to receive the pixel parameters and perform a shader operations on the pixels, wherein the shader unit performs an ambient occlusion process for each pixel of the display by:
   based on the pixel depth values and a projection matrix used to render the scene, computing a 3-D eye space position for a surface point corresponding to the pixel;
   based on the pixel eye space position, the pixel normal vector, and the depth values, computing horizon heights in relation to the point;
   based on the horizon heights, computing an occlusion term for the pixel;
   based on the pixel eye space position, the pixel normal vector, the depth values and the horizon heights, computing a normal occlusion term for the point; and
   computing an ambient occlusion illumination value comprising an inter-object occlusion value by combining the horizon occlusion term and the normal occlusion term.

2. The GPU of claim 1, wherein the pixel parameters of the pixels of the display further include pixel color values, and wherein final per pixel colors are computed by combining pixel color values with ambient occlusion illumination values.

3. The GPU of claim 2, further comprising:
rendering the final per pixel colors into a frame buffer of the GPU for displaying on a monitor.

4. The GPU of claim 1, wherein the pixel depth values are stored in a depth buffer of the GPU.

5. The GPU of claim 1, wherein the pixel normal values are stored in a normal buffer of the GPU.

6. The GPU of claim 1, wherein a horizon tracing process is used to determine the horizon height at the point on the surface.

7. The GPU of claim 6, wherein the horizon tracing produces a piecewise constant approximation of a horizon line on a hemisphere centered at the point on the surface.

8. The GPU of claim 1, wherein the ambient occlusion process is performed in an image space and does not require computation based on scene geometry.

9. The GPU of claim 1, further comprising rendering the final per pixel colors into a frame buffer of the GPU for displaying on a monitor for a real-time interactive 3-D graphics application.

10. A computer system for computing ambient occlusion illumination for a scene, comprising:
a processor coupled to a bus and a memory coupled to the bus, the memory having instructions stored there in that when executed by the processor implement a method for computing ambient occlusion illumination;
a GPU having a set-up unit for receiving a group of primitives from a graphics application and generating edge descriptions for the primitives and a rasterizer unit coupled to the setup unit for receiving the edge descriptions and rasterizing the primitives into pixel parameters of pixels of a display, wherein the parameters include pixel depth values and pixel normal vectors;
wherein the shader unit is coupled to receive the pixel parameters and perform a shader operations on the pixels, and wherein the shader unit performs an ambient occlusion process for each pixel of the display by:
based on the pixel depth values and a projection matrix used to render the scene, computing a 3-D eye space position for a surface point corresponding to the pixel;
based on the pixel eye space position, the pixel normal vector, and the depth values, computing horizon heights in relation to the point;
based on the horizon heights, computing an occlusion term for the pixel;
based on the pixel eye space position, the pixel normal vector, the depth values and the horizon heights, computing a normal occlusion term for the point; and
computing an ambient occlusion illumination value comprising an inter-object occlusion value by combining the horizon occlusion term and the normal occlusion term.

11. The computer system of claim 10, wherein the pixel parameters of the pixels of the display further include pixel color values, and wherein final per pixel colors are computed by combining pixel color values with ambient occlusion illumination values.

12. The computer system of claim 10, further comprising rendering the final per pixel colors into a frame buffer of the GPU for displaying on a monitor for a real-time interactive 3-D graphics application.

* * * * *